United States Patent
Khatibi et al.

(10) Patent No.: US 9,628,974 B2
(45) Date of Patent: Apr. 18, 2017

(54) NETWORK INDICATION TO TRIGGER AN APPLICATION

(71) Applicant: QUALCOMM Incorporated, San Diego, CA (US)

(72) Inventors: Farrokh Khatibi, San Diego, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/589,950

(22) Filed: Jan. 5, 2015

(65) Prior Publication Data

US 2015/0201316 A1  Jul. 16, 2015

Related U.S. Application Data

(60) Provisional application No. 61/926,906, filed on Jan. 13, 2014.

(51) Int. Cl.
*H04M 11/04* (2006.01)
*H04W 4/22* (2009.01)
(Continued)

(52) U.S. Cl.
CPC ............. *H04W 4/22* (2013.01); *H04W 4/02* (2013.01); *H04W 72/042* (2013.01); *H04W 76/007* (2013.01)

(58) Field of Classification Search
CPC ....... H04W 4/22; H04W 4/02; H04W 76/007; H04W 72/042
See application file for complete search history.

(56) References Cited

U.S. PATENT DOCUMENTS

| | | | |
|---|---|---|---|
| 2009/0227265 A1* | 9/2009 | Kang | H04W 60/04 455/456.1 |
| 2012/0220325 A1* | 8/2012 | Zhou | H04W 74/0833 455/509 |
| 2012/0302199 A1* | 11/2012 | Yamashita | H04W 4/22 455/404.2 |

OTHER PUBLICATIONS

"3rd Generation Partnership Project; Technical Specification Group Core Network and Terminals; Technical realization of Cell Broadcast Service (CBS) (Release 12)", 3GPP Standard; 3GPP TS 23.041, 3rd Generation Partnership Project (3GPP), Mobile Competence Centre ; 650, Route Des Lucioles ; F-06921 Sophia-Antipolis Cedex; France, vol. CT WG1, No. V12.4.0, Dec. 19, 2013 (Dec. 19, 2013), pp. 1-67, XP050729049.

(Continued)

*Primary Examiner* — Martin Mushambo
(74) *Attorney, Agent, or Firm* — Arent Fox LLP

(57) ABSTRACT

A method, an apparatus, and a computer program product for wireless communication are provided. The apparatus may be a UE. The UE receives system information including a trigger message and additional information. In addition, the UE enables an application and provides the additional information to the application based on the trigger message. The additional information may include location information. The UE may display map-related information associated with the location information. The UE may receive previous system information prior to receiving the system information. The previous system information may include an alert message, and the location information may be associated with the alert message. The previous system information may include an MID within a predetermined set of MIDs. The system information may include an MID different from the predetermined set of MIDs. The map-related information may indicate a geographic area associated with the location information in the system information.

50 Claims, 13 Drawing Sheets

(51) Int. Cl.
*H04W 4/02* (2009.01)
*H04W 72/04* (2009.01)
*H04W 76/00* (2009.01)

(56) References Cited

OTHER PUBLICATIONS

"3rd Generation Partnership Project; Technical Specification Group Services and System Aspects; Earthquake and Tsunami Warning System (ETWS) Requirements and Solutions; Solution Placeholder (Release 8)" 3GPP Standard; 3GPP TR 23.828, 3rd Generation Partnership Project (3GPP), Mobile Competence Centre; 650, Route Des Lucioles; F-06921 Sophia-Antipolis Cedex; France, No. V8.0.0, Sep. 1, 2008 (Sep, 1, 2008), pp. 1-22, XP050363891 paragraphs [04.2], [006].

"3rd Generation Partnership Project; Technical Specification Group Services and System Aspects; Public Warning System (PWS) requirements (Release 12)", 3GPP Standard; 3GPP TS 22.268, 3rd Generation Partnership Project (3GPP), Mobile Competence Centre; 650, Route Des Lucioles ; F-06921 Sophia-Antipolis Cedex ; France, vol. SA WG1, No. V12.2.0, Jun. 28, 2013 (Jun. 28, 2013), pp. 1-16, XP050711961.

International Search Report and Written Opinion—PCT/US2015/010308—ISA/EPO—Mar. 30, 2015.

\* cited by examiner

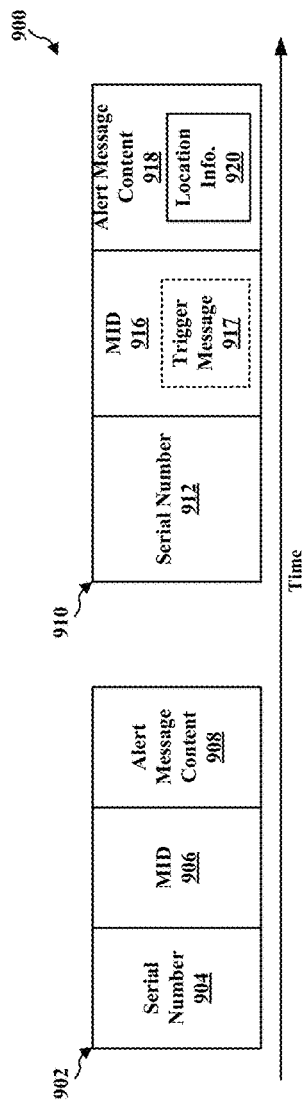
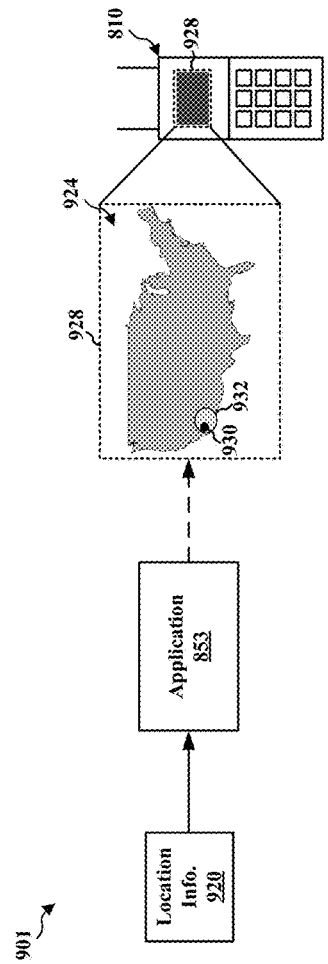
FIG. 9A
FIG. 9B

NETWORK INDICATION TO TRIGGER AN APPLICATION

CROSS-REFERENCE TO RELATED APPLICATION(S)

This application claims the benefit of U.S. Provisional Application Ser. No. 61/926,906, entitled "NETWORK INDICATION TO TRIGGER AN APPLICATION" and filed on Jan. 13, 2014, which is expressly incorporated by reference herein in its entirety.

BACKGROUND

Field

The present disclosure relates generally to communication systems, and more particularly, to an enhancement related to a wireless emergency alert (WEA) system. More specifically, the present disclosure relates to an indication provided by a network to trigger an application.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The UE receives system information including a trigger message and additional information. In addition, the UE enables an application and provides the additional information to the application based on the trigger message.

BRIEF DESCRIPTION OF THE DRAWINGS

FIG. 9A is a diagram illustrating an example of alert messages received by a UE.

FIG. 9B is a diagram illustrating an example of location information provided to an application for displaying map-related information.

DETAILED DESCRIPTION

Figure 1:
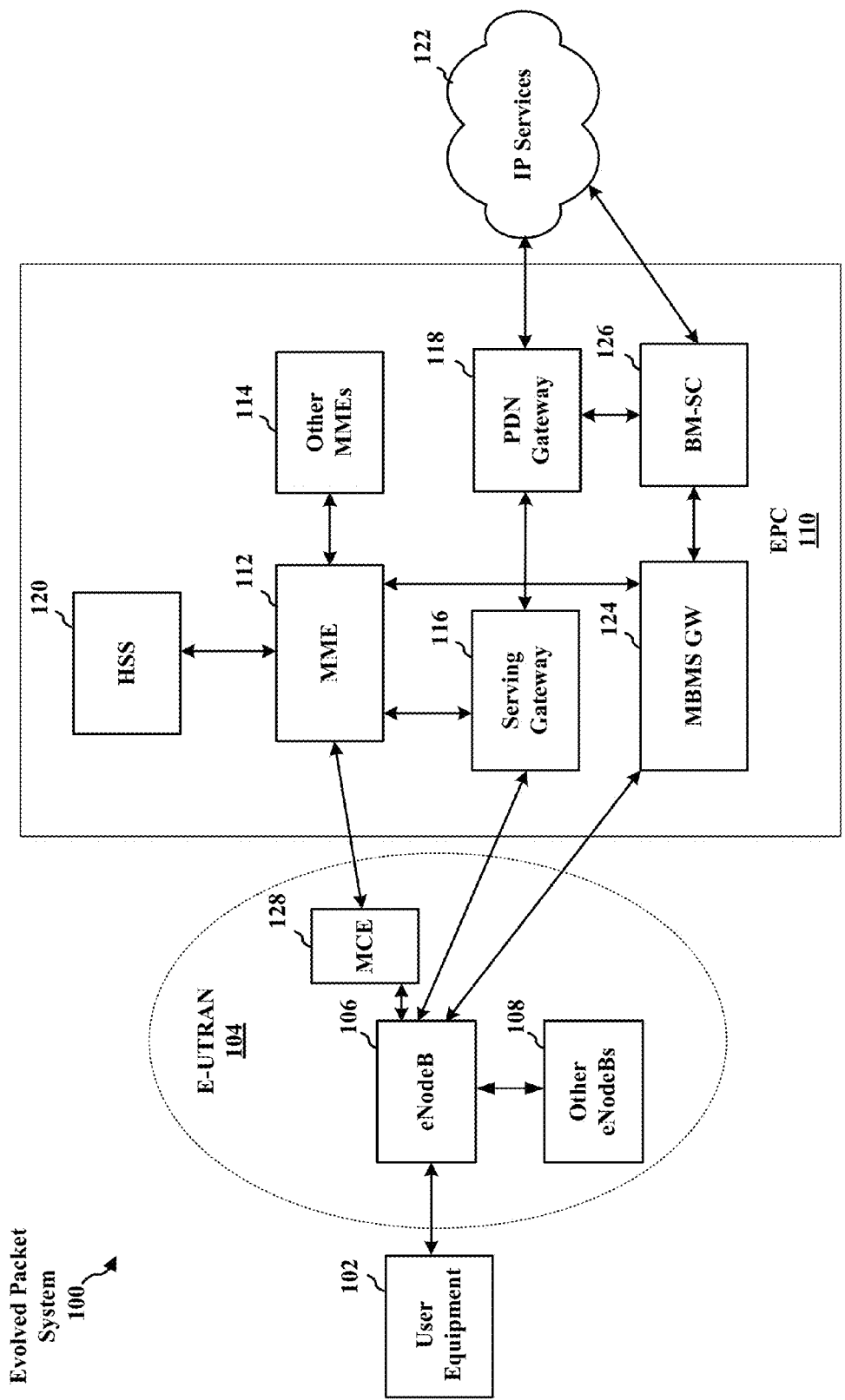
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
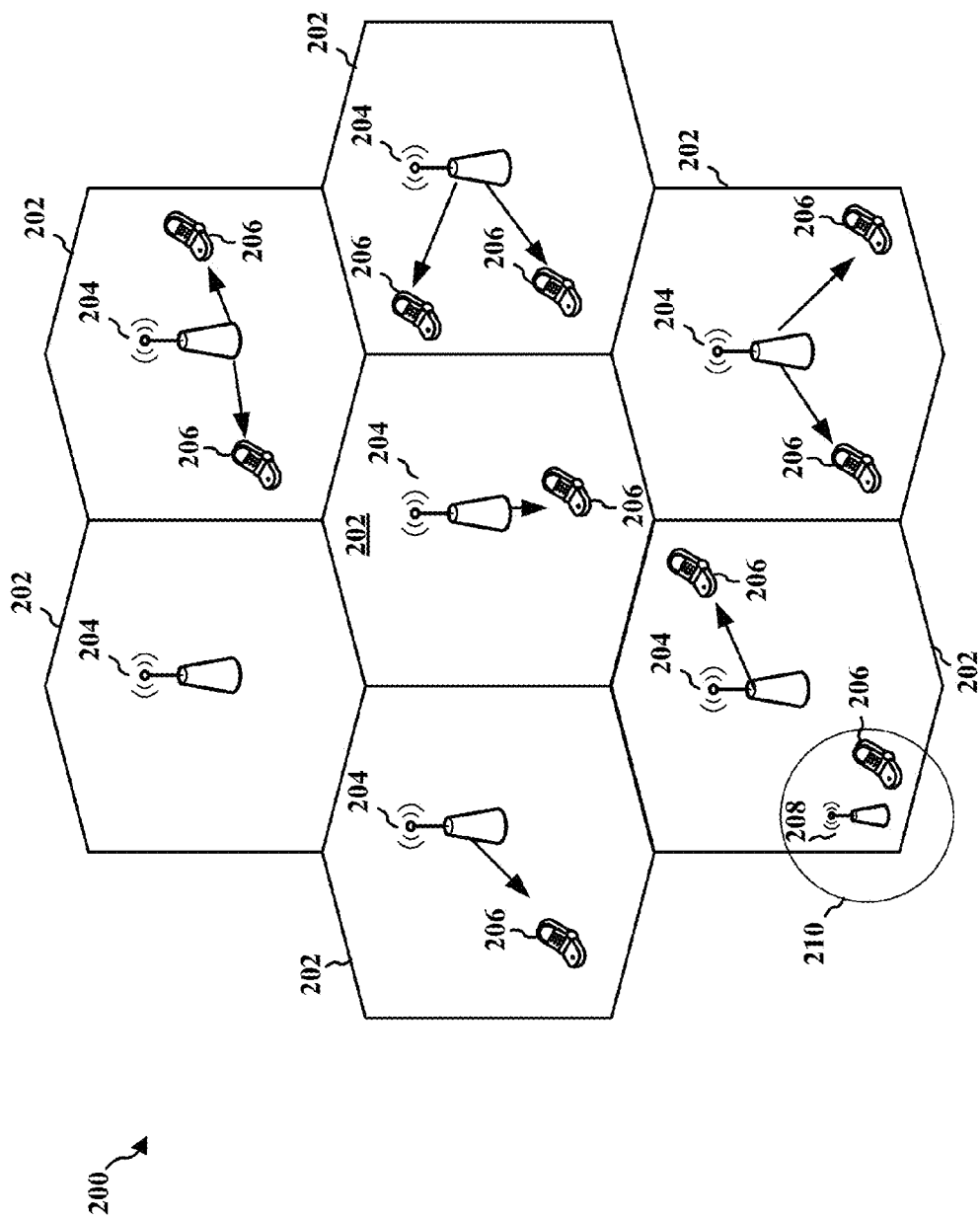
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
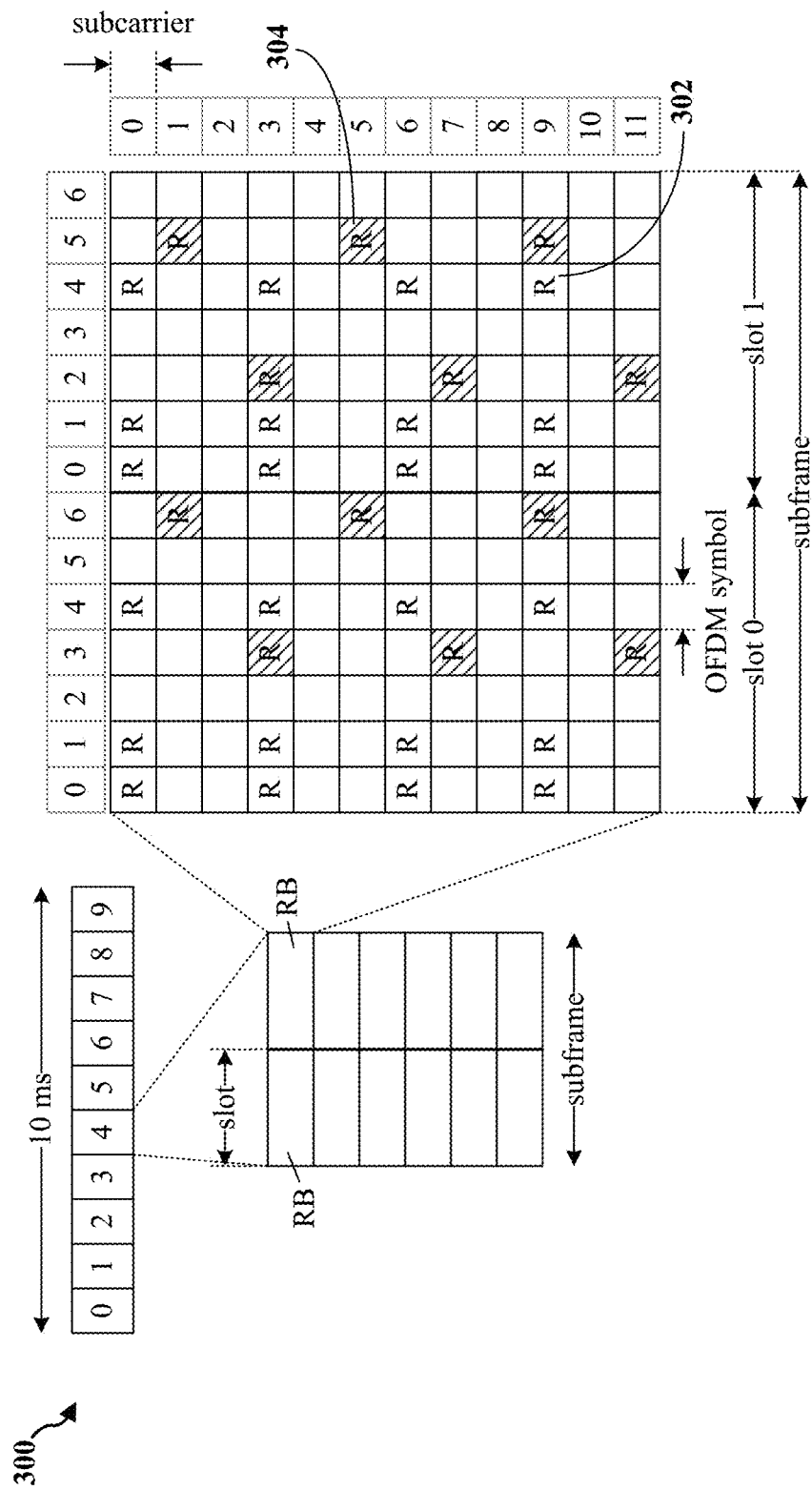
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
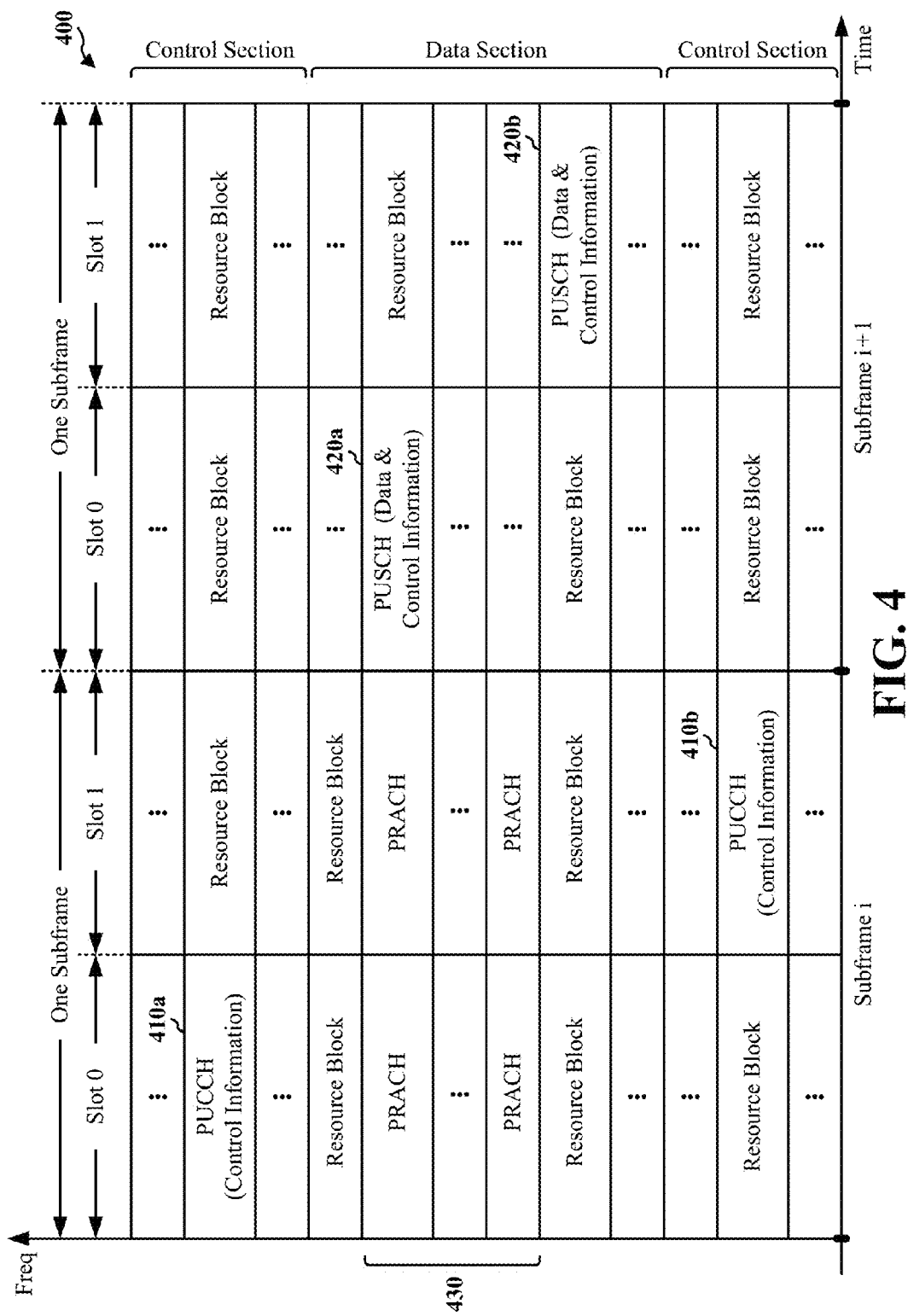
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
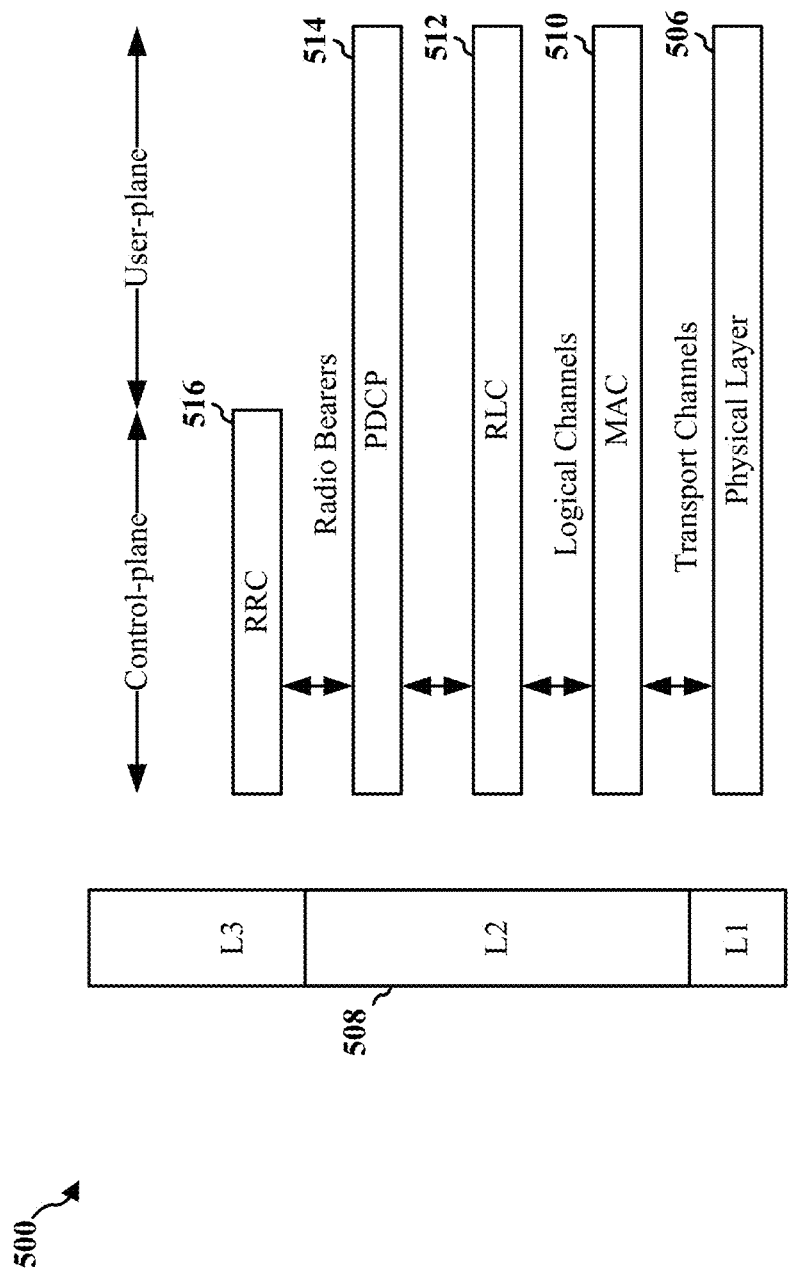
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
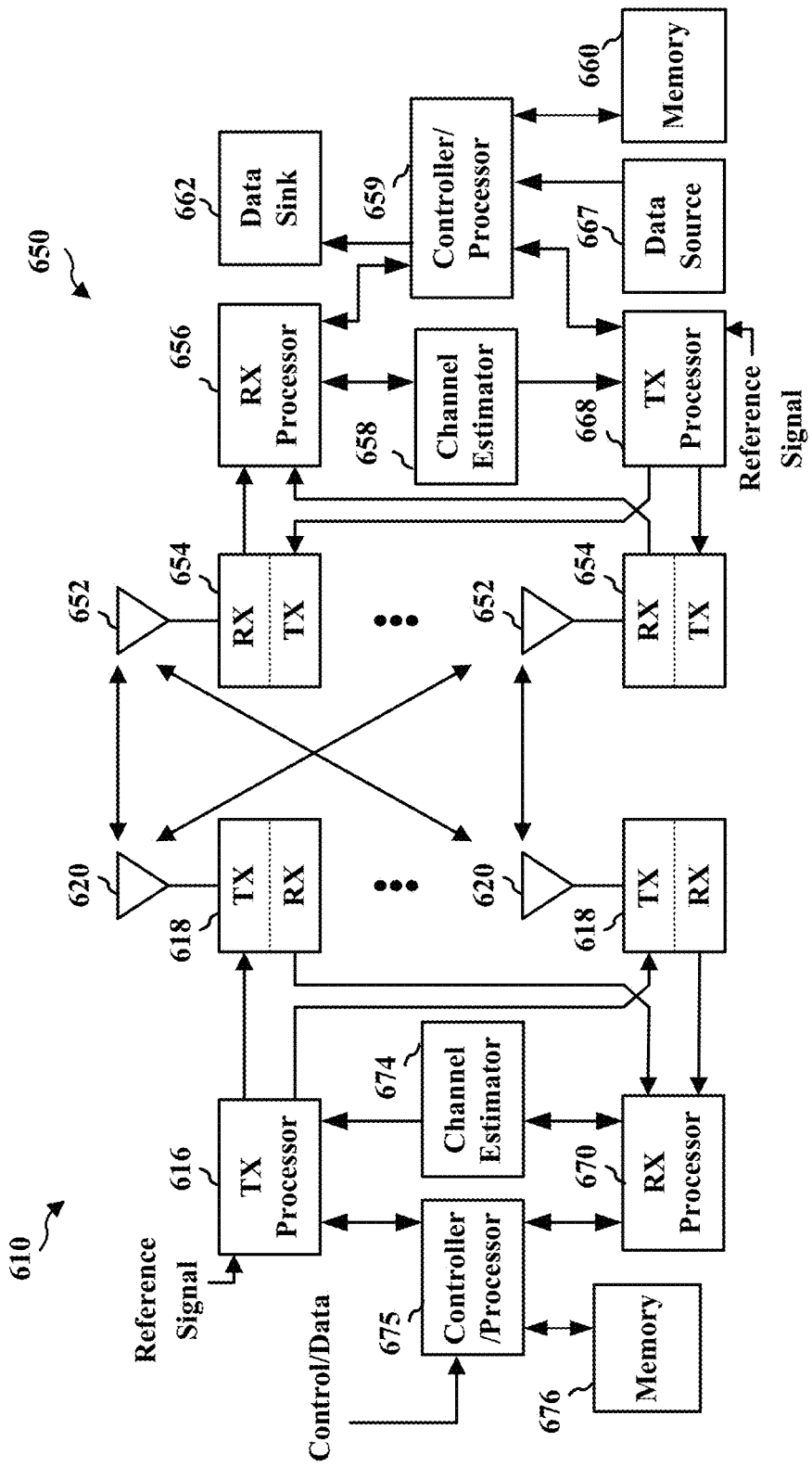
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656.

The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
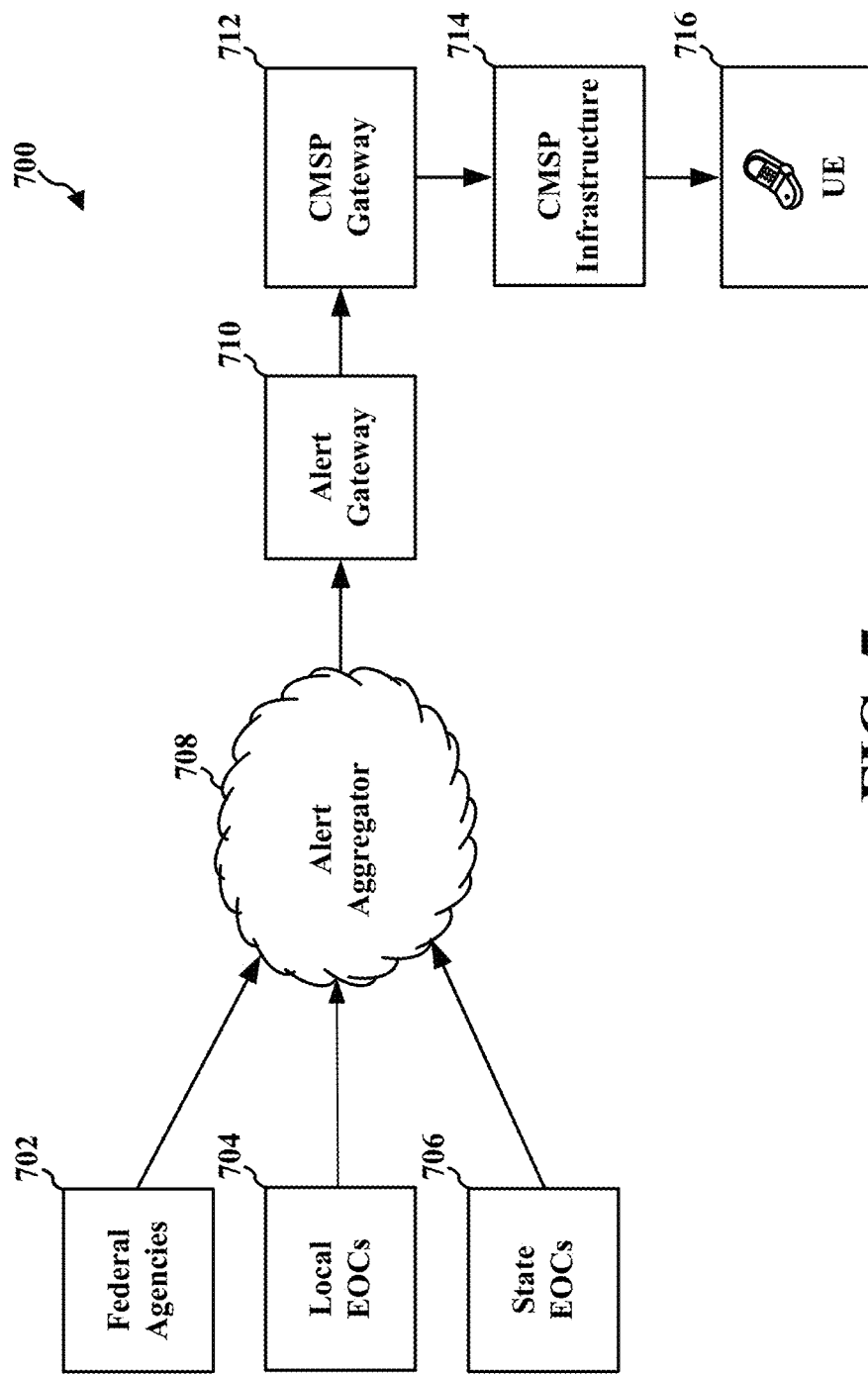
FIG. 7 is a diagram illustrating an example of a WEA system.

FIG. 7 is a diagram 700 illustrating an example of a WEA system. Generally, the WEA system uses broadcast technology to provide geographically-targeted and timely alert messages to UEs. Using the WEA system, alert messages may be transmitted to UEs to notify users about an emergency. An emergency may be an earthquake, a tsunami, a flood, a tornado, a wildfire, an act of terrorism, a child abduction (e.g., an AMBER alert), or any other type of emergency.

By way of background, U.S. law currently requires commercial mobile service providers (CMSPs) (sometimes referred to herein as "providers") to elect between transmitting and not transmitting alert messages. A provider that elects not to transmit alert messages must notify its subscribers of its election not to transmit alert messages as well as to provide notification about its election not to transmit alert messages at the point-of-sale. Many providers have already elected to transmit alert messages to their subscribers. A provider that elects to transmit alert messages must comply with applicable standards, protocols, and/or procedures. Standards, protocols, and/or procedures may be provided by the Alliance for Telecommunications Industry Solutions (ATIS), Telecommunications Industry Association (TIA), and/or joint ATIS/TIA groups. An example of a related standard is Joint ATIS/TIA Commercial Mobile Alert System (CMAS) Federal Alert Gateway to CMSP Gateway Interface Specification (J-STD-101). A provider that elects to transmit alert messages must also comply with federal regulations (e.g., regulations adopted by the U.S. Federal Communications Commission (FCC)). Government collaboration with the WEA system is provided by the FCC, Federal Emergency Management Agency (FEMA), and Department of Homeland Security (DHS).

As illustrated in FIG. 7, alert messages may originate from federal agencies 702, local emergency operations centers (EOCs) 704, and state EOCs 706. Alert messages may also originate from other sources not illustrated in FIG. 7 without deviating from the scope of the present disclosure. An alert message may be triggered by various types of emergencies, such as an earthquake, a tsunami, a flood, a tornado, a wildfire, an act of terrorism, and/or child abduction (e.g., an AMBER alert). Alert messages originating from various sources (e.g., federal agencies 702, local EOCs, and state EOCs 706) are provided to an alert aggregator 708. In some configurations, the alert aggregator 708 may authenticate the alert messages. Authentication may involve checking the authenticity of the alert message to confirm that the alert message was transmitted by an authorized source (e.g., a federal agency 702, a local EOC, or a state EOC 706) in order to prevent unauthorized sources (e.g., terrorist, hackers, etc.) from causing fraudulent alert messages to be disseminated to UEs using the WEA system. The alert aggregator 708 may provide the alert messages to an alert gateway 710. The alert gateway 710 may provide the alert messages to the providers (i.e., CMSPs) that have elected to transmit alert messages to their subscribers. In some configurations, the alert aggregator 708 and the alert gateway 710 may be administered by a governmental entity (e.g., a federal agency).

If a provider (i.e., CMSP) has elected to transmit alert messages, the alert gateway 710 may transmit the alert message to the CMSP gateway 712 of that provider. The CMSP gateway 712 may be configured to determine a severity of the alert message (referred to as "severity information") as well as a geographic area associated with the emergency. For example, the CMSP gateway may determine that an earthquake has high severity and the CMSP gateway may also determine that the geographic area associated with the emergency is a 10-mile radius with respect to the earthquake epicenter in downtown San Diego. Based on the information determined by the CMSP gateway, the provider may utilize various components of its CMSP infrastructure 714 to transmit the alert message to particular UEs 716. The CMSP infrastructure 714 may include a cell-broadcast entity (CBE), a cell broadcast center (CBC), a mobile management entity (MME), and/or an eNB, as will be described infra with reference to FIG. 10. Based on the severity information and the geographic area associated with the emergency, the provider may utilize the eNBs located with the 10-mile radius of the earthquake epicenter in downtown San Diego to transmit the alert message to all UEs within that geographic area. Because the WEA system employs broadcast technology, all of those UEs will receive the alert message at (or nearly at) the same time. Also, because the geographic area affected by the emergency is limited to a 10-mile radius of downtown San Diego, the provider would not transmit the alert message to UEs located outside of that geographic area.

Figure 8:
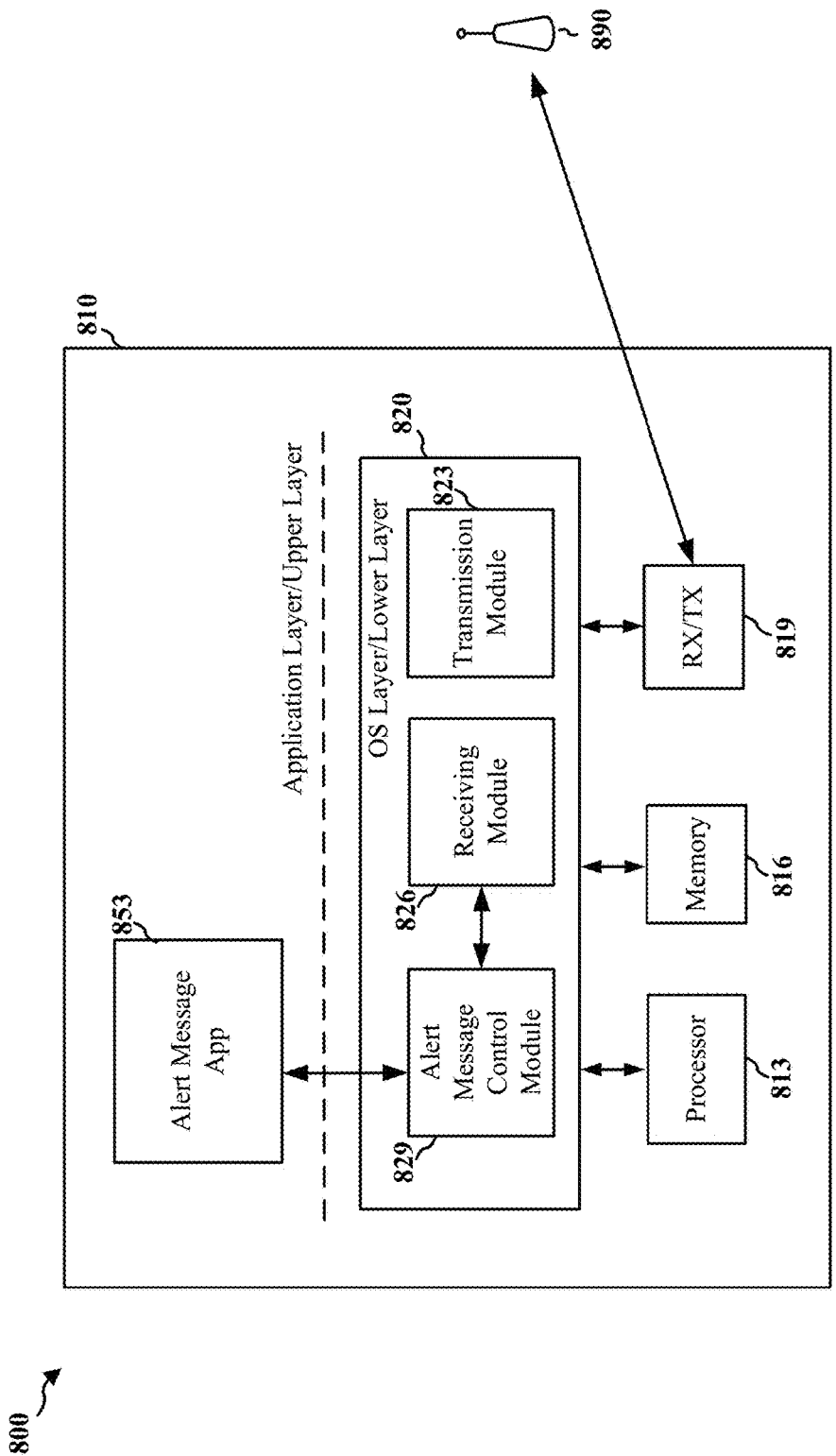
FIG. 8 is a diagram illustrating functional components of a UE.

FIG. 8 is a diagram 800 illustrating functional components of a UE. An exemplary UE 810 has, among other components, a processor 813, a memory 816, and a receiver/transmitter 819. The memory 816 may include a volatile data storage device such as a RAM and/or a non-volatile data storage device such as a flash memory or a solid-state memory device. An operating system (OS) 820 (or other system management software) manages and allocates the resources of the components of the UE 810. In one configuration, the OS 820 may have a transmission module 823 and a receiving module 826 that manage the receiver/transmitter 819. In another configuration, the transmission module 823 and the receiving module 826 may be separate from, but in communication with, the OS 820.

An alert message application 853 may run on the OS 820. The UE 810 also has an alert message control module 829 in communication with the alert message application 853, the components of the OS 820, the transmission module 823, and the receiving module 826. In one configuration, the alert message control module 829 may be a component of the OS 820. In another configuration, the alert message control module 829 may be separate from, but in communication with, the OS 820. The alert message application 853 is in an upper layer (e.g., application layer) relative to the alert message control module 829, the receiving module 826, and the transmission module 823, which are in a lower layer (e.g., OS layer).

As will be described infra, the receiving module 826 may receive, via the receiver/transmitter 819, one or more alert messages carried by, for example, a Cell Broadcast Service (CBS) service of an eNB 890. The alert message control module 829 subsequently obtains the one or more alert messages from the receiving module 826. In certain circumstances, the alert message control module 829 may process the alert messages and display the alert message content on the UE 810. In certain circumstances, the alert message control module 829 may send the alert message content to the alert message application 853, which accordingly displays the alert message content on the UE 810.

FIG. 9A is a diagram 900 illustrating an example of alert messages received by the UE 810. Alert information relating to an event may be carried in one or more alert messages. For example, FIG. 9A shows that alert information relating to a specific event is carried in a first alert message 902 and a second alert message 910.

In one configuration, the CBE (e.g., an information source) sends alert (emergency) information (e.g., warning type, warning message, impacted area, time period) to the CBC. For example, the alert information may be regarding an earthquake in San Diego.

Using the impacted area information, the CBC identifies which MMEs need to be contacted. In this example, the impacted area information may specify a geographic area of a 10-mile radius of downtown San Diego. Accordingly, the CBC can identify the MMEs that manage the cells in the specified geographic area of the 10-mile radius of downtown San Diego.

Further, the CBC prepares one or more alert messages to carry the alert information. In this example, the CBC prepares two alert messages, i.e., the first alert message 902 and the second alert message 910, regarding the earthquake in San Diego. Particularly, the first alert message 902 may include a serial number 904, a Message Identifier (MID) 906, and alert message content 908. The second alert message 910 may include a serial number 912, an MID 916, and alert message content 918. The serial number 904 may be unique to the first alert message 902 (e.g., the serial number 904 is different from the serial number 912). A serial number identifies a particular alert message from the source and type indicated by an MID and may be altered every time the alert message with a given MID is changed. An MID identifies the source and type of the alert message. For example, the California Earthquake Authority (which is the source) and Earthquake Warning (which is the type) may correspond to one value. A number of alert messages may originate from the same source and/or may be of the same type. These alert messages may be distinguished by the serial numbers. The MID 906 and the MID 916 each may be a numeric value. The CBC may set the numeric value as one of a predetermined set of MIDs such as the MIDs defined in $3^{rd}$ Generation Partnership Project; Technical Specification Group Core Network and Terminals; Technical realization of Cell Broadcast Service (CBS) (Release 12) (3GPP TS 23.041 V12.4.0 (2013-12)). Particularly, the predetermined set of MIDs may be MIDs in the range of 4370-4382. An MID equal to 4370 may correspond to a presidential alert, which is an alert issued by the President of the United States. As another example, an MID equal to 4379 may correspond to child abduction (e.g., an AMBER alert). In this example, the MID 906 is set to be one of the predetermined set of MIDs. The MID 916 is set to a value not in the predetermined set of MIDs.

The CBC also constructs one or more alert requests each including an alert message and associated delivery attributes such as MID, Serial Number, Tracking Area ID (TAI) list, Warning Area, Operation and Maintenance Centre (OMC) ID, Concurrent Warning Message (CWM) Indicator, Send Write-Replace-Warning-Indication, and Global eNB ID. The CBC then sends the one or more alert requests to the selected MMEs.

After receiving the alert requests, an MME may select, based on the TAI ID list attribute, which eNodeBs to forward the alert requests to. Then, the MME forwards the alert requests to the selected eNodeBs, which includes the eNB 890 in this example.

The eNB 890 (or other selected eNBs) may be configured with the TAI(s) and Cell ID(s) it serves and the Emergency Area ID(s) that it belongs to. The Warning Area attribute in an alert request may be a list of Cell IDs, a list of TAIs, or one or more Emergency Area IDs. After receiving the alert requests, the eNB 890 checks for any match of the contents of the Warning Area attribute with these IDs to identify the cells where to distribute the alert messages. The eNB 890 then obtains the one or more alert messages from the one or more alert requests, and broadcasts the alert messages (e.g., the first alert message 902 and the second alert message 910) to the UEs, which includes the UE 810 in this example, in the selected cells. The eNB 890 may send to the UE 810 one or more alert messages (e.g., the first alert message 902 and the second alert message 910) in one or more system information blocks (SIBs), e.g., of system information block type 12 (SIB 12), on PDSCH. Thus, the first alert message 902 and the second alert message 910 are system information.

The receiving module 826 of the UE 810 receives the broadcast alert messages through the receiver/transmitter 819. The receiving module 826 forwards the alert messages to the alert message control module 829. The alert message control module 829 is configurable by a user or by another program to ignore certain alert messages based on the MIDs of the alert messages. Therefore, the UE 810 displays the content of the alert messages having MIDs from a collection of predetermined MIDs; the UE 810 refrains from displaying the content of the alert messages having other MIDs. For example, with respect to the first alert message 902, the alert message control module 829 may be configured to extract, and determine the value of, the MID 906, and only to process the first alert message 902 when the MID 906 is equal to one of one or more predetermined values (e.g., 4370, which indicates that the alert is a presidential alert). The alert message control module 829 is configured to ignore or to discard the first alert message 902 when the MID 906 has other values (e.g., 4379, which corresponds to child abduction, i.e., an AMBER alert). Thus, the UE 810 refrains from displaying the alert message content 908 when the first alert message 902 has an MID that is not one of the predetermined values.

Legacy systems of UEs may be configured to only recognize the MIDs from the predetermined set of MIDs. In other words, in this example, when a legacy system of a UE receives the first alert message 902, which has an MID from the predetermined set (e.g., in the range of 4370-4382), the legacy system recognizes the MID and displays the alert message content 908 on the UE. When a legacy system receives the second alert message 910, which does not have an MID from the predetermined set, the legacy system does not recognize the MID and discards the second alert message 910. For instance, when the MID 916 of the second alert message 910 is equal to 4396, a legacy system ignores the second alert message 910.

With respect to the UE 810, the alert message control module 829 is configured to process the alert messages having MIDs from the predetermined set. For example, the alert message control module 829 may extract the alert message content 908 from the first alert message 902 and then display the alert message content 908 on the UE 810.

In addition, the system of the UE 810 is an improved system and the alert message control module 829 is configured to recognize the MIDs not in the predetermined set. In certain configurations, those recognized MIDs not in the predetermined set may form another predetermined collection of MIDs. In other words, the alert message control module 829 is configured to recognize the MIDs in the predetermined set and MIDs in the predetermined collection. The alert message control module 829 may discard alert messages having MIDs not in the predetermined set or the predetermined collection. In this example, the first alert message 902, having an MID from the predetermined set, provides alert information with respect to an alert event and can be recognized by both legacy systems and improved systems (e.g., the system of the UE 810). The second alert message 910, having an MID not in the predetermined set but in the predetermined collection, provides additional information (e.g., the alert message content 918) regarding the same alert event, and can be recognized by the improved systems but are ignored by the legacy systems. Particularly, the CBC may set the serial number 912 of the second alert message 910 to be in a predetermined relationship with (e.g., to follow or to be the same as) the serial number 904 of the first alert message 902 to indicate that the second alert message 910 is associated with the first alert message 902 and provides additional information regarding the alert event specified by the first alert message 902. In certain configurations, the CBC may configure the first alert message 902 and the second alert message 910 to carry the alert information not associated with each other. For example, the first alert message 902 and the second alert message 910 may represent two different alert events.

When the alert message control module 829 of the UE 810 receives the second alert message 910, the alert message control module 829 determines that the MID 916 is not one of the predetermined set of MIDs. The alert message control module 829 may, instead of ignoring the second alert message 910 as the legacy systems do, send the alert message content 918 of the second alert message 910 to the alert message application 853. The alert message application 853 may provide an application programming interface (API) through which the alert message control module 829 can send the alert message content 918 to the alert message application 853.

Specifically, the alert message control module 829 may consider the MID 916 as a trigger message 917. In response to detecting the trigger message 917, the alert message control module 829 does not itself process the alert message content 918 or display the alert message content 918. Rather, the alert message control module 829 extracts the alert message content 918 and sends the alert message content 918 to the alert message application 853 for processing and display. In this example, the alert message content 918 may include location information 920.

FIG. 9B is a diagram 901 illustrating an example of the location information 920 provided to the alert message application 853 for displaying map-related information 924. The alert message application 853 may be software installed or otherwise configured in the UE 810. The alert message application 853 may be developed by third party application developers. The alert message application 853 may be configured to process the location information 920 as well as other information (e.g., the Global Positioning System (GPS) location of the UE 810). The location information 920 may include a geographic area associated with an alert. For example, the location information 920 may indicate the geographic area (e.g., a 10-mile radius of downtown San Diego) associated with the alert (e.g., an earthquake). In one example, the location information 920 may include a GPS coordinate and a radius, multiple GPS coordinates to define boundary, or other means for defining the geographic area. The geographic area may be referred to as a polygon or polygon information.

More specifically, in this example, upon receiving the first alert message 902, the alert message control module 829 may display, for example, text based alert information on the UE 810. Upon receiving the second alert message 910, the alert message control module 829 determines that the alert message content 918 of the second alert message 910 is to be sent to the alert message application 853 based on the MID 916. The alert message control module 829 further determines that the second alert message 910 is associated with the first alert message 902 based on the serial numbers of the first alert message 902 and the second alert message 910 as described supra. After obtaining the location information 920 from the second alert message 910, the alert message control module 829 may send the location information 920 to the alert message application 853 for display. Accordingly, the alert message application 853 displays map-related information 924 on the display 928 of the UE 810 based on the location information 920. The map-related information 924 may indicate the geographic area associated with the location information 920 in the second alert message 910 (see FIG. 9A). Also, the map-related information 924 may indicate a geographic location 930 of the UE 810. For example, the map-related information 924 may indicate that the geographic area 932 of an earthquake as well as the geographic location 930 of the UE 810. The second alert message 910 was provided to the UE 810 because the UE 810 is located in the geographic area 932 of the earthquake. If the UE 810 was located outside of the geographic area 932 of the earthquake, the second alert message 910 (as well as the first alert message 902) may not have been provided to the UE 810. In certain configurations, the alert message control module 829 may send to the alert message application 853 some alert information obtained from the first alert message 902. Thus, the alert message application 853 may display indications that the alert information displayed by the alert message application 853 is associated with the alert information displayed by the alert message control module 829. In this example, the first alert message 902 may have information regarding the time at which an alert event (e.g., an earthquake) occurred. The alert message control module 829 may send the time information to the alert message application 853 along with the location information 920 of the second alert message 910. Thus, the alert message application 853 may display the map-related information 924 as well as an indication that the map-related information 924 is for the alert event occurred at the time specified by the time information.

As described supra, in accordance with various aspects of the present disclosure, the alert message control module 829 does not ignore the second alert message 910 because the MID 916 is not one of the predetermined set of MIDs. Instead, the alert message control module 829 provides the location information 920 of the second alert message 910 to the alert message application 853. The alert message application 853 presents the map-related information 924 on the display 928 of the UE 810.

One of ordinary skill in the art will appreciate that any MID that is different from the predetermined set of MIDs may be pre-set, pre-selected, pre-determined, or otherwise configured in the UE 810 in accordance with various communication standards, protocols, and/or procedures. For example, an MID equal to 4396 may not be one of the predetermined set of MIDs (e.g., in the range 4370-4382). Nonetheless, various communication standards, protocols, and/or procedures may pre-set, pre-select, pre-determine, or otherwise standardize that an MID equal to 4396 corresponds to a particular type of information.

In some configurations, the alert message control module 829 determines to send the location information 920 of the second alert message 910 to the alert message application 853 for displaying the map-related information 924 when the first alert message 902 is received and the location information 920 of the second alert message 910 is associated with the first alert message 902.

As described supra, in some configurations, the first alert message 902 includes an MID 906 within a predetermined set of MIDs (e.g., in the range 4370-4382), and the second alert message 910 includes an MID 916 (e.g., 4396) different from the predetermined set of MIDs. In some configurations, the serial number 912 of the second alert message 910 is greater than or equal to the serial number 904 of the previous first alert message 902.

Figure 10:
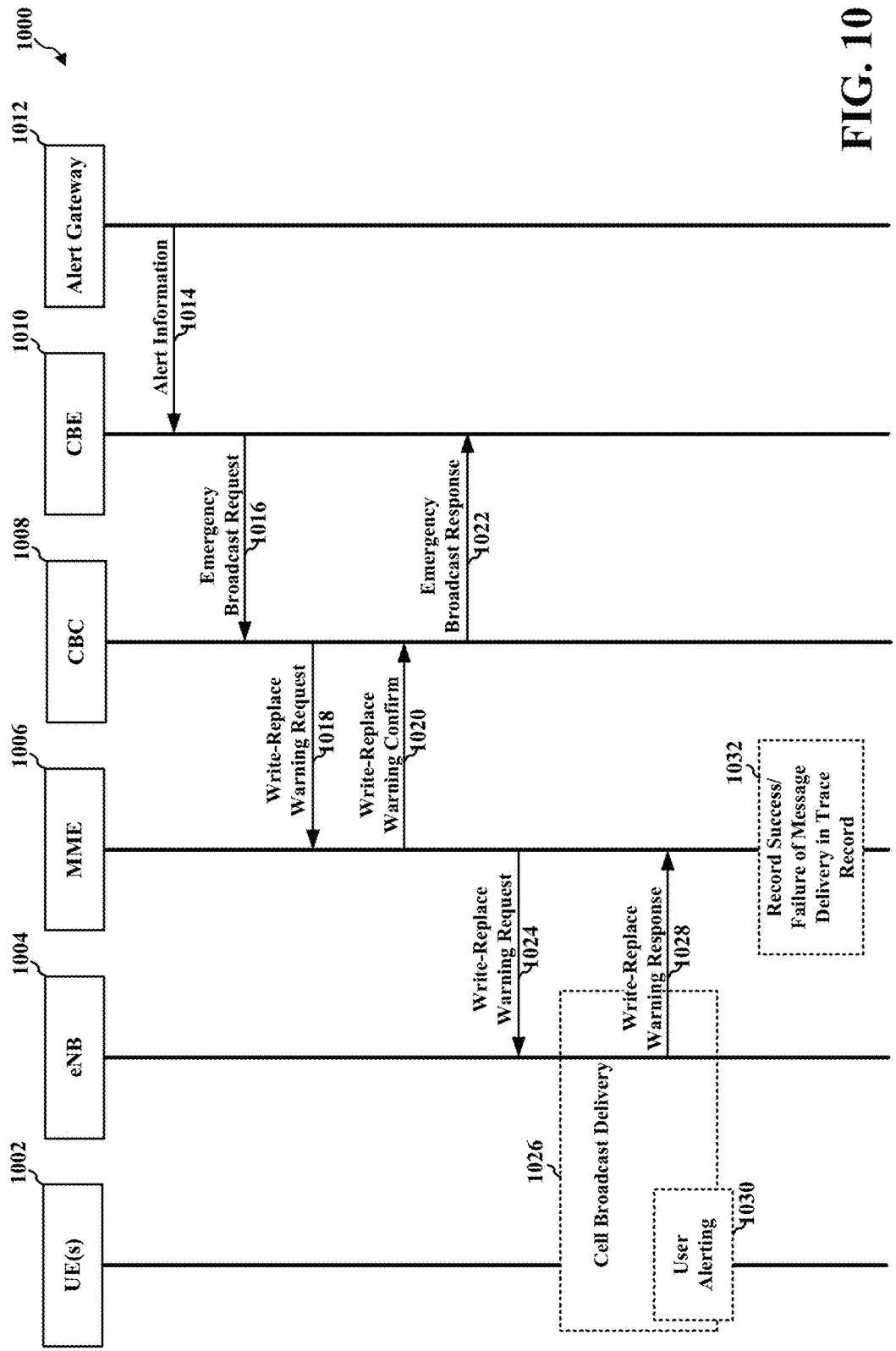
FIG. 10 is a diagram illustrating an example of a signaling sequence for transmitting alert messages.

FIG. 10 is a diagram 1000 illustrating an example of a signaling sequence that may be used by providers for transmitting alert messages. However, alternative systems may be used by providers without deviating from the scope of the present disclosure. Particularly, the signaling sequence illustrated may be used to send the first alert message 902 and the second alert message 910 to the UE 810. As described supra, the alert gateway 1012 provides alert information to providers (i.e., CMSPs) that have elected to provide alert information to their subscribers. Providers may utilize various components (e.g., the CBE 1010, the CBC 1008, the MME 1006, and/or the eNB 1004) to transmit alert messages to the UEs in a particular geographic area.

At operation 1014, alert information may be transmitted from the alert gateway 1012 to the CBE 1010. For example, the alert information may include general information regarding an earthquake as well as the location information of the earthquake in the example described supra. At operation 1016, in response to receiving the alert information, the CBE 1010 may transmit an emergency broadcast request signal containing the alert information to the CBC 1008. At operation 1018, in response to receiving the emergency broadcast request signal, in one operation, the CBC 1008 may transmit a write-replace warning request signal containing, e.g., the first alert message 902 to the MME 1006. In another operation, the CBC 1008 may transmit another write-replace warning request signal containing, e.g., the second alert message 910 to the MME 1006. If the MME 1006 receives a write-replace warning request signal, at operation 1020, the MME 1006 may transmit a write-replace warning confirm signal back to the CBC 1008. At operation 1022, in response to receiving the write-replace warning confirm signal, the CBC 1008 may transmit an emergency broadcast response signal back to the CBE 1010. At operation 1024, the MME 1006 may transmit a write-replace warning request signal containing, e.g., the first alert message 902 or the second alert message 910 to the eNB 1004. At operation 1026, in response to receiving the write-replace warning response signal, the eNB 1004 may perform cell broadcast delivery.

During cell broadcast delivery, the eNB 1004 may transmit an alert message (e.g., the first alert message 902 or the second alert message 910) to the UE(s) 1002 located in a particular geographic area. As discussed supra, the eNB 1004 may broadcast the alert message to only the UE(s) 1002 that are in a particular geographic area (e.g., the geographic area associated with an emergency) and may refrain from broadcasting the alert message to UE(s) 1002 that are outside of that particular geographic area. At operation 1028, the eNB 1004 may transmit a write-replace warning response signal back to the MME 1006. In some configurations, operation 1026 and operation 1028 may be performed at (or nearly at) the same time. At operation 1030, in response to the cell broadcast delivery from the eNB 1004 to the UE(s) 1002, the UE(s) 1002 may provide user alerting. In some configurations, user alerting may include a text message displayed on a display of the UE(s) in response to that the UE(s) receive(s) an alert message having an MID from a first predetermined set of MIDs (e.g., the first alert message 902). In some configurations, user alerting may include map-related information displayed on the display of the UE(s) in response to that the UE(s) receive(s) an alert message having an MID from a second predetermined set of MIDs (e.g., the second alert message 910), as described supra with reference to FIGS. 9A and 9B. Finally, at operation 1032, the MME 1006 may record a success or failure regarding the alert message delivery in a trace record.

Figure 11:
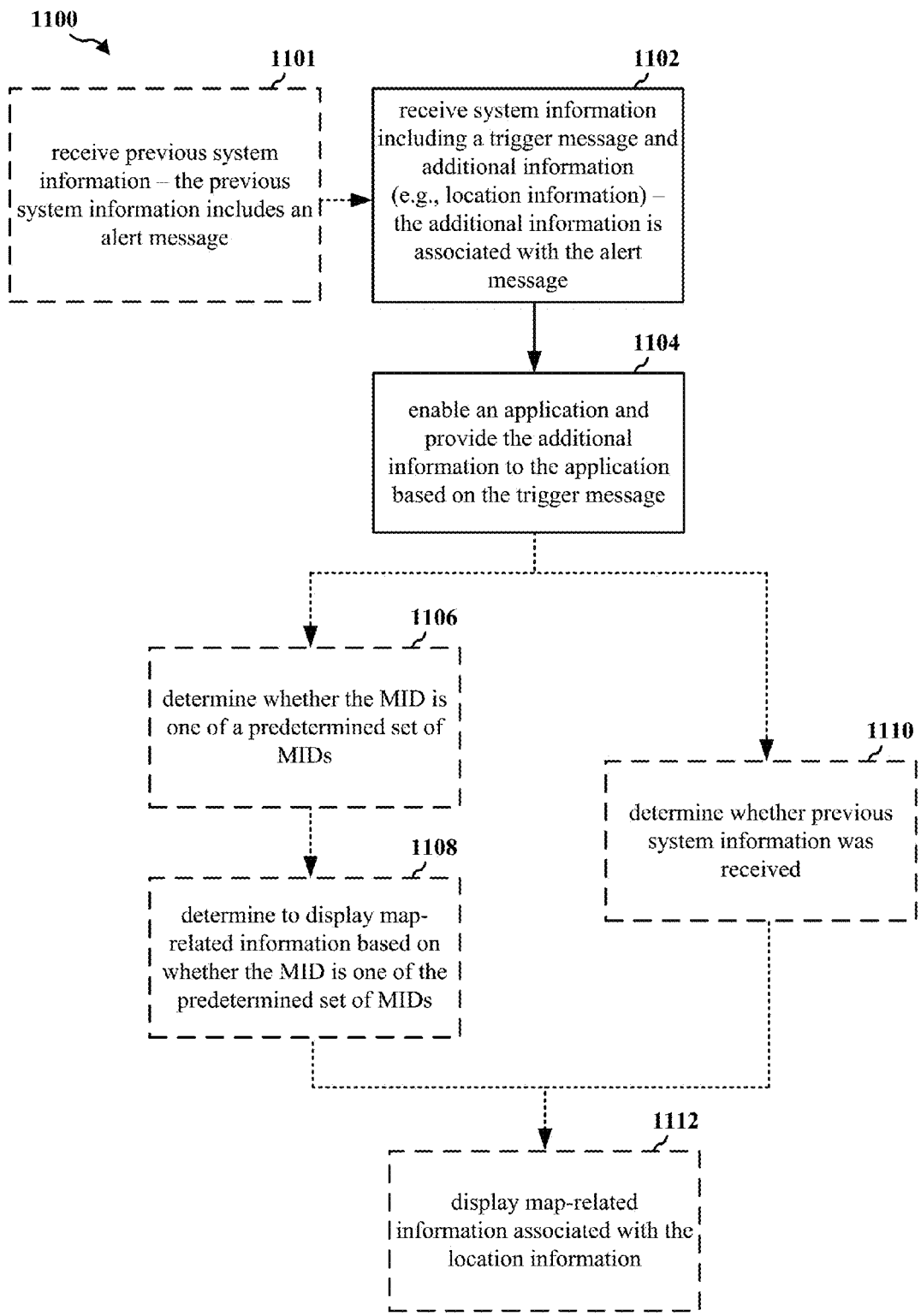
FIG. 11 is a flow chart of a method of wireless communication.

FIG. 11 is a flow chart 1100 of a method of wireless communication. The method may be performed by a UE. At block 1101, the UE receives previous system information. At block 1102, the UE receives system information including a trigger message and additional information (e.g., location information, as described supra). The additional information may be associated with the alert message of the previously received system information. For example, referring to FIG. 9A, the UE receives the previous system information (i.e., the first alert message 902) and the system information (i.e., the second alert message 910), which includes the trigger message 917 and the additional information (i.e., the alert message content 918). The additional information may include the location information 920. In some configurations, the system information is received in a SIB 12. In some configurations, the system information is received via the PDSCH.

At block 1104, the UE enables an application and provides the additional information to the application based on the trigger message. For example, referring to FIGS. 9A-9B, the UE enables the alert message application 853 and provides the location information 920 (included in the additional information) to the application based on the MID 916 (included in the trigger message 917). For instance, when the MID 916 (e.g., 4396) is not one a predetermined set of MIDs (e.g., in the range 4370-4382), the UE enables the alert message application 853 and provides the location information 920 to the alert message application 853.

In some configurations, at block 1106, the UE determines whether the MID is one of a predetermined set of MIDs. For example, referring back to FIG. 9A, the UE may determine whether the MID 916 is in the range 4370-4382. At block 1108, the UE determines to display map-related information based on whether the MID is one of the predetermined set of MIDs. For example, referring to FIGS. 9A-9B, the UE may determine to display the map-related information 924 when the MID 916 is not within the predetermined set of MIDs 4370-4382. When the MID 916 is not within the predetermined set of MIDs 4370-4382, the UE may assume that the message (i.e., additional information) includes map-related information 924. However, the UE may determine to refrain from displaying the map-related information 924 when the MID 916 is within the predetermined set of MIDs 4370-4382. When the MID 916 is within the predetermined set of MIDs 4370-4382, the UE may assume that the message (i.e., alert message content 908) does not include map-related information 924.

In some configurations, at block 1110, the UE determines whether previous system information was received. For example, referring to FIGS. 9A-9B, the UE may receive previous system information. The UE may determine to display the map-related information 924 when the previous system information (i.e., the first alert message 902) is received and the location information 920 of the system information (i.e., the second alert message 910) is associated with the previous system information. The UE may assume that the system information is associated with the previous system information when the system information is received after the previous system information and has a serial number 912 greater than or equal to the serial number 904 of the previous system information. The UE may determine the association of the system information to the previous system information through other means, such as through information within the additional information.

In some configurations, the previous system information includes an alert message, and the location information 920 is associated with the alert message. In some configurations, the previous system information includes an MID 906 within a predetermined set of MIDs (e.g., in the range 4370-4382), and the system information includes an MID 916 (e.g., 4396) different from the predetermined set of MIDs. In some configurations, the system information includes a serial number 912 that is greater than or equal to the serial number 904 of the previous system information.

Finally, at block 1112, the UE displays map-related information associated with the location information. For example, referring to FIG. 9B, the UE 810 may display map-related information 924 associated with the location information 920. In some configurations, the location information 920 indicates a geographic area 932 associated with an alert (e.g., an earthquake). In some configurations, the map-related information 924 indicates a geographic area 932 associated with the location information 920 in the system information. For example, the map-related information may display the geographic area 932 as a 10-mile radius with respect to an earthquake epicenter in downtown San Diego. In some configurations, the map-related information 924 indicates a geographic location 930 of the UE 810. For example, the map-related information 924 may display the geographic location 930 of the UE 810, which is inside of the geographic area 932. The UE 810 may receive the system information because the geographic location 930 of the UE 810 is inside of the geographic area 932, as illustrated in FIG. 9B. However, if the geographic location 930 of the UE 810 is not inside of the geographic are 932, the UE 810 may not receive the system information.

The various aspects provided herein may be backward-compatible and may have minimal to no impact on existing infrastructures of providers (i.e., CMSPs). Further, the UE may continue to receive alert messages having an MID within the predetermined range (e.g., in the range 4370-4382) while also receiving alert messages not within the predetermined range (e.g., 4396). Additionally, third party application developers may provide map-related information 924 in various forms and/or with various features without deviating from the scope of the present disclosure.

Figure 12:
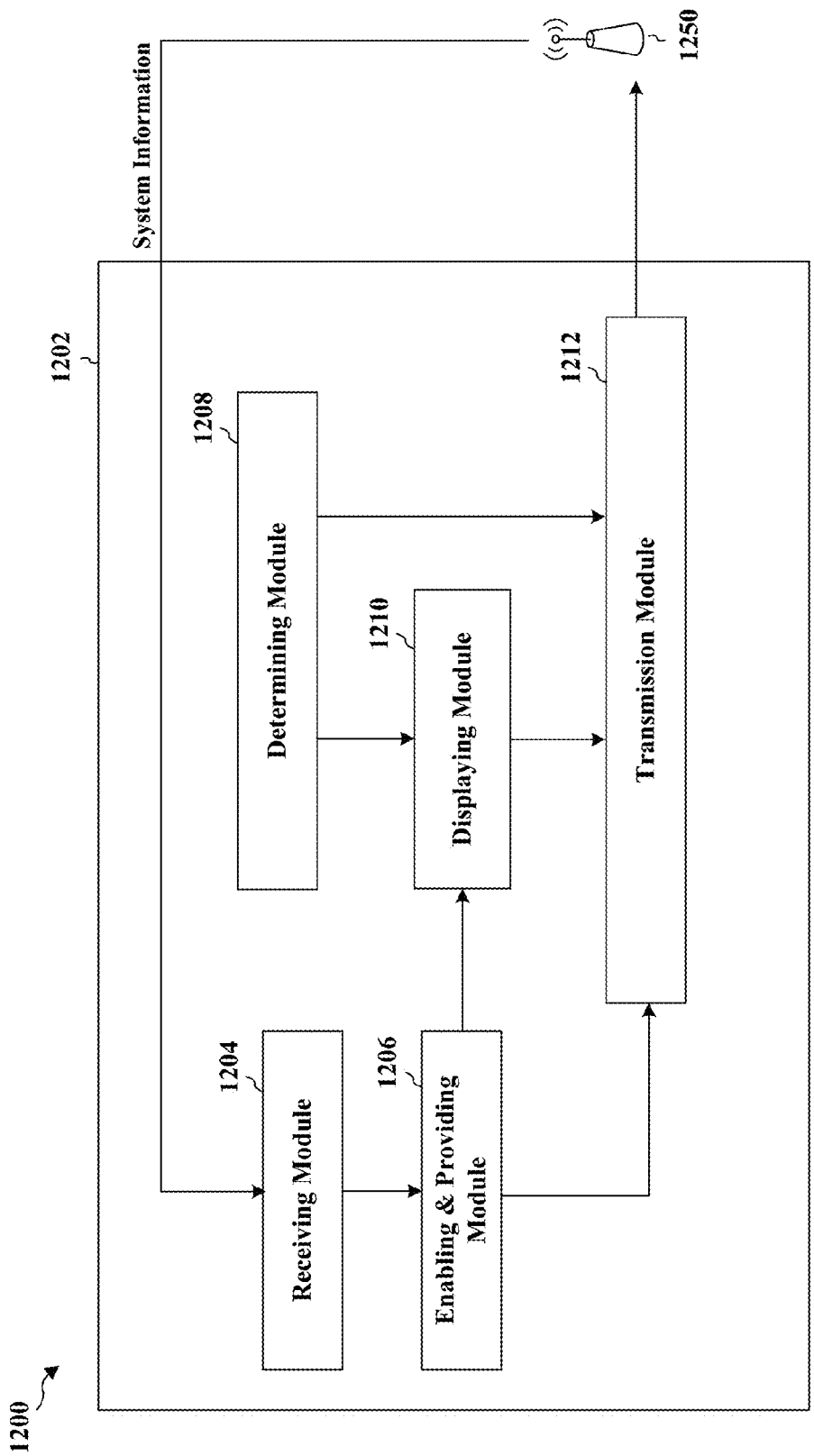
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus 1202 includes a receiving module 1204, an enabling and providing module 1206, a determining module 1208, a displaying module 1210, and a transmission module 1212. The enabling and providing module 1206, the determining module 1208, and the displaying module 1210 may correspond to the alert message control module 829.

The receiving module 1204 is configured to receive system information. The system information includes a trigger message and additional information. The additional information may include location information. The enabling and providing module 1206 is configured to enable an application and to provide the additional information to the application based on the trigger message. The displaying module 1210 is configured to display map-related information associated with the location information.

The receiving module 1204 may be further configured to receive previous system information prior to receiving the system information. The previous system information may include an alert message, and the location information may be associated with the alert message. The previous system information may include a MID within a predetermined set of MIDs, and the system information may include an MID different from the predetermined set of MIDs. The previous system information may include a first serial number and the system information may include a second serial number greater than or equal to the first serial number.

The system information may include an MID. The determining module 1208 may be further configured to determine whether the MID is one of a predetermined set of MIDs. The determining module 1208 may be further configured to determine to display the map-related information based on whether the MID is one of the predetermined set of MIDs.

The determining module 1208 may be further configured to determine whether previous system information was received. The displaying module 1210 may be configured to determine to display the map-related information when the previous system information is received and the location information is associated with the previous system information.

The location information may indicate a geographic area associated with an alert. The map-related information may indicate a geographic area associated with the location information in the system information. The map-related information may indicate a geographic location of the UE. The system information may be received in a SIB 12. The system information may be received via a PDSCH.

The apparatus may include additional modules that perform each of the blocks of the algorithm in the aforementioned flow chart of FIG. 11. As such, each block in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
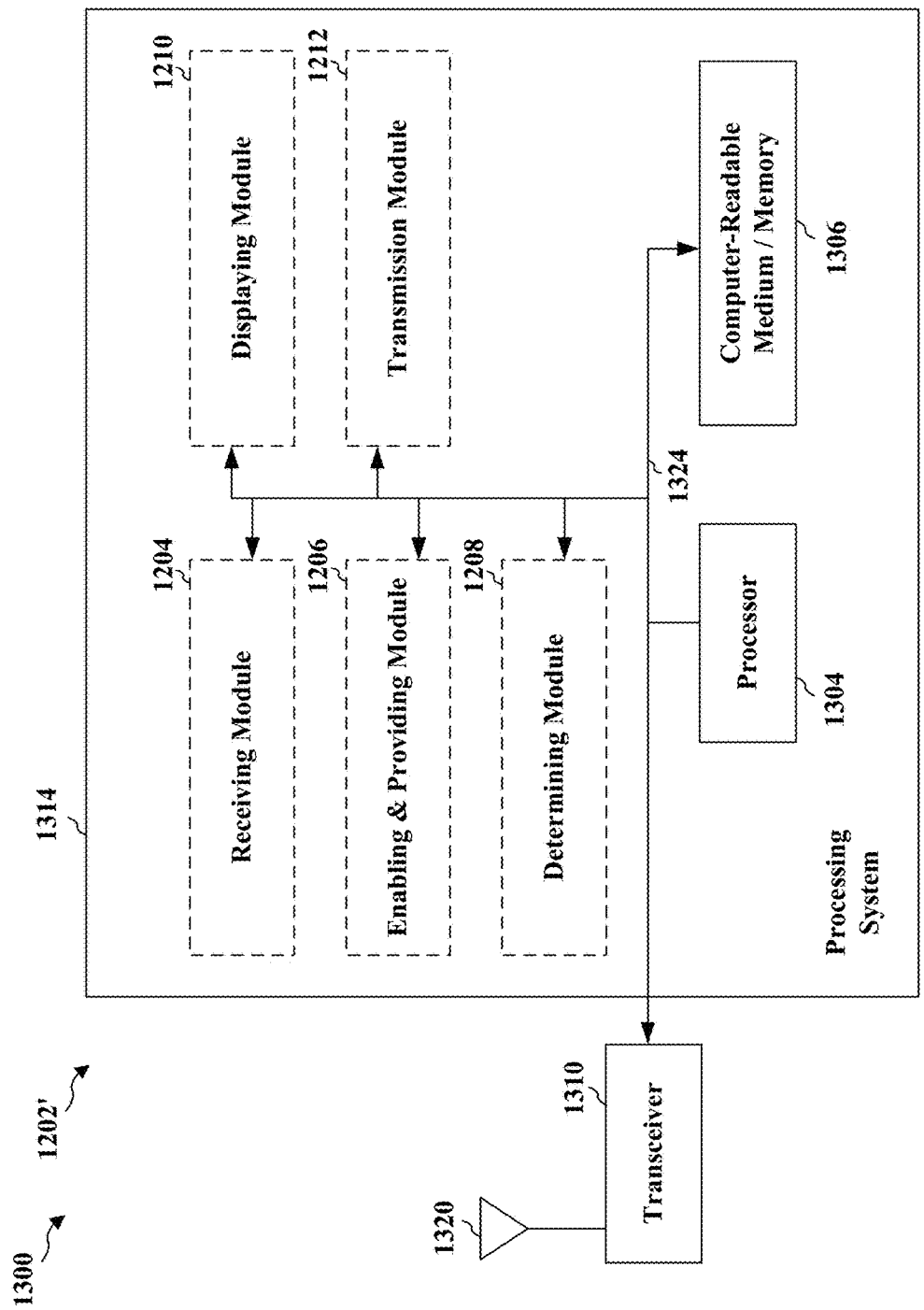
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, 1212. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for receiving system information including a trigger message and additional information, and means for enabling an application and providing the additional information to the application based on the trigger message. The additional information may include location information. The apparatus 1202/1202' may further include means for displaying map-related information associated with the location information. The apparatus 1202/1202' may further include means for receiving previous system information prior to receiving the system information. The previous system information may include an alert message, and the location information may be associated with the alert message. The system information may further include an MID. The apparatus 1202/1202' may further include means for determining whether the MID is one of a predetermined set of MIDs, and means for determining to display the map-related information based on whether the MID is one of the predetermined set of MIDs. The apparatus 1202/1202' may further include means for determining whether previous system information was received. The means for displaying may be configured to determine to display the map-related information when the previous system information is received and the location information is associated with the previous system information. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   receiving a first alert message including previous system information, the previous system information including a first serial number;
   receiving a second alert message including system information after receiving the first alert message, the second alert message including a second serial number and a second message identifier (MID), wherein the second serial number indicates whether the second alert message is associated with the first alert message;
   determining that the second alert message is associated with the first alert message based on the second serial number;
   determining that the second MID is not within a predetermined set of MIDs; and
   enabling an application and providing additional information to the application based on determining that the second alert message is associated with the first alert message and that the second MID is not within the predetermined set of MIDs.

2. The method of claim 1, wherein the additional information includes location information, the method further comprising:
displaying map-related information associated with the location information.

3. The method of claim 2, wherein the previous system information includes alert message content, and wherein the location information is associated with the alert message content.

4. The method of claim 2, further comprising:
determining to display the map-related information based on determining that the MID is not within the predetermined set of MIDs.

5. The method of claim 2, wherein displaying the map-related information includes displaying when the previous system information is received and the location information is associated with the previous system information.

6. The method of claim 2, wherein the location information indicates a geographic area associated with an alert.

7. The method of claim 2, wherein the map-related information indicates a geographic area associated with the location information in the system information.

8. The method of claim 2, wherein the map-related information indicates a geographic location of the UE.

9. The method of claim 1, wherein the previous system information includes a first MID within a predetermined set of MIDs.

10. The method of claim 9, wherein the first MID and the second MID each identify an alert message source and an alert message type.

11. The method of claim 9, wherein the predetermined set of MIDs correspond to a range of MIDs from a first MID value to a second MID value greater than the first MID value.

12. The method of claim 1, wherein the second serial number is greater than or equal to the first serial number.

13. The method of claim 1, wherein the system information is received in a system information block (SIB) 12.

14. The method of claim 1, wherein the system information is received via a physical downlink shared channel (PDSCH).

15. An apparatus for wireless communication, comprising:
means for receiving a first alert message including previous system information, the previous system information including a first serial number;
means for receiving a second alert message including system information after receiving the first alert message, the second alert message including a second serial number and a second message identifier (MID), wherein the second serial number indicates whether the second alert message is associated with the first alert message;
means for determining that the second alert message is associated with the first alert message based on the second serial number;
means for determining that the second MID is not within a predetermined set of MIDs; and
means for enabling an application and providing additional information to the application based on determining that the second alert message is associated with the first alert message and that the second MID is not within the predetermined set of MIDs.

16. The apparatus of claim 15, wherein the additional information includes location information, the apparatus further comprising:
means for displaying map-related information associated with the location information.

17. The apparatus of claim 16, wherein the previous system information includes alert message content, and wherein the location information is associated with the alert message content.

18. The apparatus of claim 16, further comprising:
means for determining to display the map-related information based on determining that the MID is not within one of the predetermined set of MIDs.

19. The apparatus of claim 16, wherein the means for displaying the map-related information includes displaying when the previous system information is received and the location information is associated with the previous system information.

20. The apparatus of claim 16, wherein the location information indicates a geographic area associated with an alert.

21. The apparatus of claim 16, wherein the map-related information indicates a geographic area associated with the location information in the system information.

22. The apparatus of claim 16, wherein the map-related information indicates a geographic location of the UE.

23. The apparatus of claim 15, wherein the previous system information includes a first MID within a predetermined set of MIDs.

24. The apparatus of claim 15, wherein the second serial number is greater than or equal to the first serial number.

25. The apparatus of claim 15, wherein the system information is received in a system information block (SIB) 12.

26. The apparatus of claim 15, wherein the system information is received via a physical downlink shared channel (PDSCH).

27. An apparatus for wireless communication, comprising:
a memory; and
at least one processor coupled to the memory and configured to:
receive a first alert message including previous system information, the previous system information including a first serial number;
receive a second alert message including system information after receiving the first alert message, the second alert message including a second serial number and a second message identifier (MID), wherein the second serial number indicates whether the second alert message is associated with the first alert message;
determine that the second alert message is associated with the first alert message based on the second serial number;
determine that the second MID is not within a predetermined set of MIDs; and
enable an application and providing additional information to the application based on determining that the second alert message is associated with the first alert message and that the second MID is not within the predetermined set of MIDs.

28. The apparatus of claim 27, wherein the additional information includes location information, and wherein the at least one processor is further configured to:
display map-related information associated with the location information.

29. The apparatus of claim 28, wherein the previous system information includes alert message content, and wherein the location information is associated with the alert message.

30. The apparatus of claim 28, wherein the at least one processor is further configured to:
determine to display the map-related information based on determining that the MID is not within the predetermined set of MIDs.

31. The apparatus of claim 28, wherein to display the map-related information, the at least one processor is further configured to display the map-related information when the previous system information is received and the location information is associated with the previous system information.

32. The apparatus of claim 28, wherein the location information indicates a geographic area associated with an alert.

33. The apparatus of claim 28, wherein the map-related information indicates a geographic area associated with the location information in the system information.

34. The apparatus of claim 28, wherein the map-related information indicates a geographic location of the UE.

35. The apparatus of claim 27, wherein the previous system information includes a first MID within a predetermined set of MIDs.

36. The apparatus of claim 27, wherein the second serial number is greater than or equal to the first serial number.

37. The apparatus of claim 27, wherein the system information is received in a system information block (SIB) 12.

38. The apparatus of claim 27, wherein the system information is received via a physical downlink shared channel (PDSCH).

39. A non-transitory computer-readable medium storing computer executable code for:
receiving a first alert message including previous system information, the previous system information including a first serial number;
receiving a second alert message including system information after receiving the first alert message, the second alert message including a second serial number and a second message identifier (MID), wherein the second serial number indicates whether the second alert message is associated with the first alert message;
determining that the second alert message is associated with the first alert message based on the second serial number;
determining that the second MID is not within a predetermined set of MIDs; and
enabling an application and providing additional information to the application based on determining that the second alert message is associated with the first alert message and that the second MID is not within the predetermined set of MIDs.

40. The non-transitory computer-readable medium of claim 39, wherein the second serial number is greater than or equal to the first serial number.

41. The non-transitory computer-readable medium of claim 39, wherein the additional information includes location information, and wherein the computer-readable medium further comprises code for:
displaying map-related information associated with the location information.

42. The non-transitory computer-readable medium of claim 41, wherein the previous system information includes alert message content, and wherein the location information is associated with the alert message content.

43. The non-transitory computer-readable medium of claim 39, wherein the previous system information includes a first MID within a predetermined set of MIDs.

44. The non-transitory computer-readable medium of claim 41, further comprising code for:
determining to display the map-related information based on determining that the MID is not within the predetermined set of MIDs.

45. The non-transitory computer-readable medium of claim 41, wherein the code for displaying the map-related information includes code for displaying when the previous system information is received and the location information is associated with the previous system information.

46. The non-transitory computer-readable medium of claim 41, wherein the location information indicates a geographic area associated with an alert.

47. The non-transitory computer-readable medium of claim 41, wherein the map-related information indicates a geographic area associated with the location information in the system information.

48. The non-transitory computer-readable medium of claim 41, wherein the map-related information indicates a geographic location of the UE.

49. The non-transitory computer-readable medium of claim 39, wherein the system information is received in a system information block (SIB) 12.

50. The non-transitory computer-readable medium of claim 39, wherein the system information is received via a physical downlink shared channel (PD SCH).

* * * * *